(12) United States Patent
Krogsrud

(10) Patent No.: US 6,865,814 B2
(45) Date of Patent: Mar. 15, 2005

(54) BUTCHER TOOL

(76) Inventor: Børre Aschehoug Krogsrud, Skogveien 6, N-3825 Lunde (NO)

( * ) Notice: Subject to any disclaimer, the term of this patent is extended or adjusted under 35 U.S.C. 154(b) by 8 days.

(21) Appl. No.: 10/398,100

(22) PCT Filed: Oct. 8, 2001

(86) PCT No.: PCT/NO01/00410
§ 371 (c)(1),
(2), (4) Date: Apr. 1, 2003

(87) PCT Pub. No.: WO02/35937
PCT Pub. Date: May 10, 2002

(65) Prior Publication Data
US 2004/0010925 A1 Jan. 22, 2004

(30) Foreign Application Priority Data
Oct. 10, 2000 (NO) .......................................... 20005095

(51) Int. Cl.$^7$ ............................................. B26B 27/00
(52) U.S. Cl. ...................................................... 30/298
(58) Field of Search ............................... 30/298; D8/98

(56) References Cited

U.S. PATENT DOCUMENTS

| | | | | | |
|---|---|---|---|---|---|
| 384,635 | A | * | 6/1888 | Maynard | 30/298 |
| 574,520 | A | * | 1/1897 | Bray | 30/298 |
| 1,027,446 | A | * | 5/1912 | Stallard | 30/298 |
| 1,074,864 | A | * | 10/1913 | Howell | 30/298 |
| 1,347,098 | A | * | 7/1920 | Hoisington | 30/298 |
| 1,442,827 | A | * | 1/1923 | Richardson | 30/298 |
| 1,455,621 | A | * | 5/1923 | Joyner | 30/298 |
| 1,559,839 | A | | 11/1925 | Asher | |
| 1,678,570 | A | * | 7/1928 | Longcor | 30/298 |
| D163,642 | S | * | 6/1951 | Serocki | 30/298 |
| 2,819,521 | A | * | 1/1958 | Parker | 30/298 |
| 3,865,370 | A | * | 2/1975 | Rogers | 30/340 |
| 3,888,006 | A | * | 6/1975 | Roberts | 30/298 |
| 4,821,416 | A | | 4/1989 | Dullinger | |
| 5,038,479 | A | * | 8/1991 | Davis | 30/298 |
| 5,588,214 | A | * | 12/1996 | Nelson | 30/298 |
| 6,029,356 | A | * | 2/2000 | Sprinkle | 30/298 |
| D484,769 | S | * | 1/2004 | Cheung | D8/98 |

FOREIGN PATENT DOCUMENTS

FR              1437295        *  3/1966   .................. 30/298

* cited by examiner

Primary Examiner—Allan N. Shoap
Assistant Examiner—Jason Prone
(74) Attorney, Agent, or Firm—Rodman & Rodman

(57) ABSTRACT

A dressing tool for opening the abdomen and diaphragm of slaughtered animals comprises a knife (1) that extends like a bridge (4) between two short, substantially cylindrical pieces of tube (2) through which two fingers can be passed in order to hold the tool during use. The short pieces of tube (2) and the bridge (4) therebetween may be made of plastic and the knife (1) is then embedded in the bridge (4), with only the knife edge exposed. The short pieces of tube (2) may have longitudinal slits (3) and/or be slightly conical. The edge of the knife (1) expediently extends along the whole edge of the bridge (4) from one of the short pieces of tube (2) to the other.

6 Claims, 1 Drawing Sheet

BUTCHER TOOL

The present application relates to a dressing tool

The most difficult part of the slaughter process is the cutting open of the slaughtered animal's diaphragm and abdomen and the removal of internal organs. When ordinary knives are used it is not always that easy for the user to see where he is passing the knife. Blood, intestines and the stomach tend to obstruct the view into the diaphragm opening and abdomen, and the stomach and perhaps even the intestines may easily be punctured.

The present invention relates to a tool for opening the diaphragm and abdomen of a slaughtered animal, and for removing the internal organs, whereby the aforementioned drawbacks and difficulties are overcome. For this purpose, the tool according to the invention consists of a knife that extends between two short, substantially cylindrical pieces of tube through which two fingers can be passed in order to hold the tool during use. Additional features of the invention will be apparent from the following description and the attached patent claims.

Figure 1:
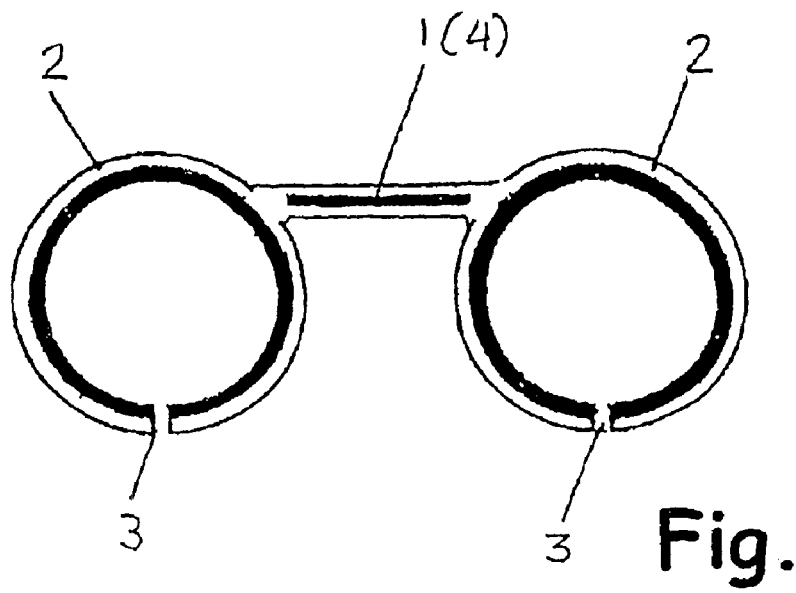
Figure 2:
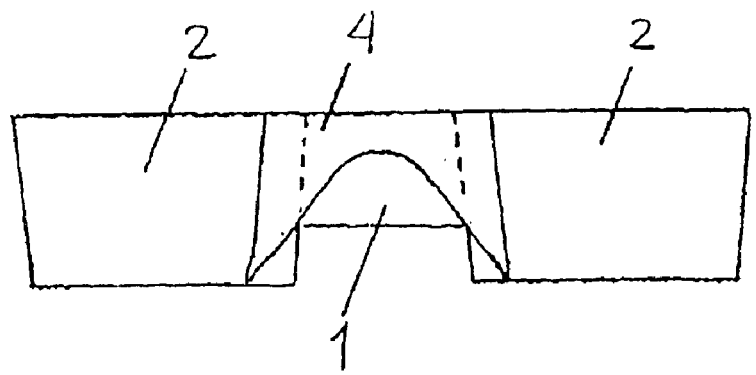

The invention will be described in more detail with reference to the attached drawing which in FIGS. 1 and 2 show respectively an end view and a top view of an exemplary embodiment of the invention.

The drawing shows a tool for opening the diaphragm and abdomen of slaughtered animals and for removing the internal organs of a slaughtered animal, comprising a sharp knife 1 that extends between two short, substantially cylindrical pieces of tube 2 through which two fingers, e.g., the index finger and the middle finger, can be passed in order to hold the tool during use. The short pieces of tube 2 are of such a length that at one end they butt against the second joint of the fingers whilst at the opposite end they allow a slight bend of the finger tips. The bending of the fingers will result in the tool being held firmly in place during use, with the edge of the knife 1 directed towards the finger tips. As shown, the short pieces of tube 2 are expediently slightly conical in order to be adapted to the natural taper towards the finger tips, and they may each have a longitudinal slit 3 so that because of a certain elasticity of the tube material they are capable of being adapted to fingers of different thickness.

Advantageously, the actual holding part of the tool, including the short pieces of tube 2 and the "bridge" 4 therebetween is made of a plastic material that is slightly elastic, the knife 1, which may be of steel, being embedded in the bridge 4 in such manner that only the edge of the knife is exposed. The knife edge expediently extends along the whole edge of the bridge 4 from one of the short pieces of tube 2 to the other.

The knife 1 in FIGS. 1 and 2 is shown as a straight knife. It should be noted, however, that the knife shaped otherwise, e.g., having a concave curve, will also be within the scope of the present invention.

When the tool according to the invention is used, an incision or cut is first made in the diaphragm, or in the abdomen, after which the tool is passed in a desired cutting direction with the finger tip in one of the short pieces of tube 2 on the inside of the diaphragm or abdomen, and the finger tip in the other short piece of tube 2 on the outside. The tool is used in the same way for removing internal organs. Thus, the cutting tool will be properly controlled at all times and there will be no danger of the knife piercing a hole or in another way puncturing the stomach or other viscera.

What is claimed is:

1. A dressing tool comprising,
   a) two separate hollow open-ended tubes of predetermined axial length through which two fingers can be passed to hold the tool during use, said tubes having respective exterior surfaces and central axes,
   b) a plate-like bridge having opposite sides respectively joined to the respective exterior surfaces of said tubes such that the joined sides are substantially parallel to the central axes and the bridge is stepped away from the central axes and is not tangent to the respective exterior surfaces, the bridge and the tubes forming an integral unit and,
   c) a knife having a cutting edge, the knife being embedded in the bridge such that only the cutting edge is exposed, the cutting edge extending from the exterior surface of one said tube to the exterior surface of the other said tube.

2. A dressing tool as disclosed in claim 1, characterized in that the tool can be used for eviscerating slaughtered animals.

3. A dressing tool as disclosed in claim 1, characterized in that the tool is used for opening a diaphragm and an abdomen of slaughtered animals.

4. A dressing tool as disclosed in claim 1, characterized in that each of the tubes has a longitudinal slit.

5. A dressing tool as disclosed in claim 1, characterized in that the tubes are shaped so as to be slightly conical, converging in the desired cutting direction of the knife.

6. A dressing tool as disclosed in claim 1, characterized in that the tubes and the bridge are made of plastic.

* * * * *